Sept. 2, 1924.
J. S. DUNCAN
1,506,889
RIBBON SPOOL
Filed March 9, 1922
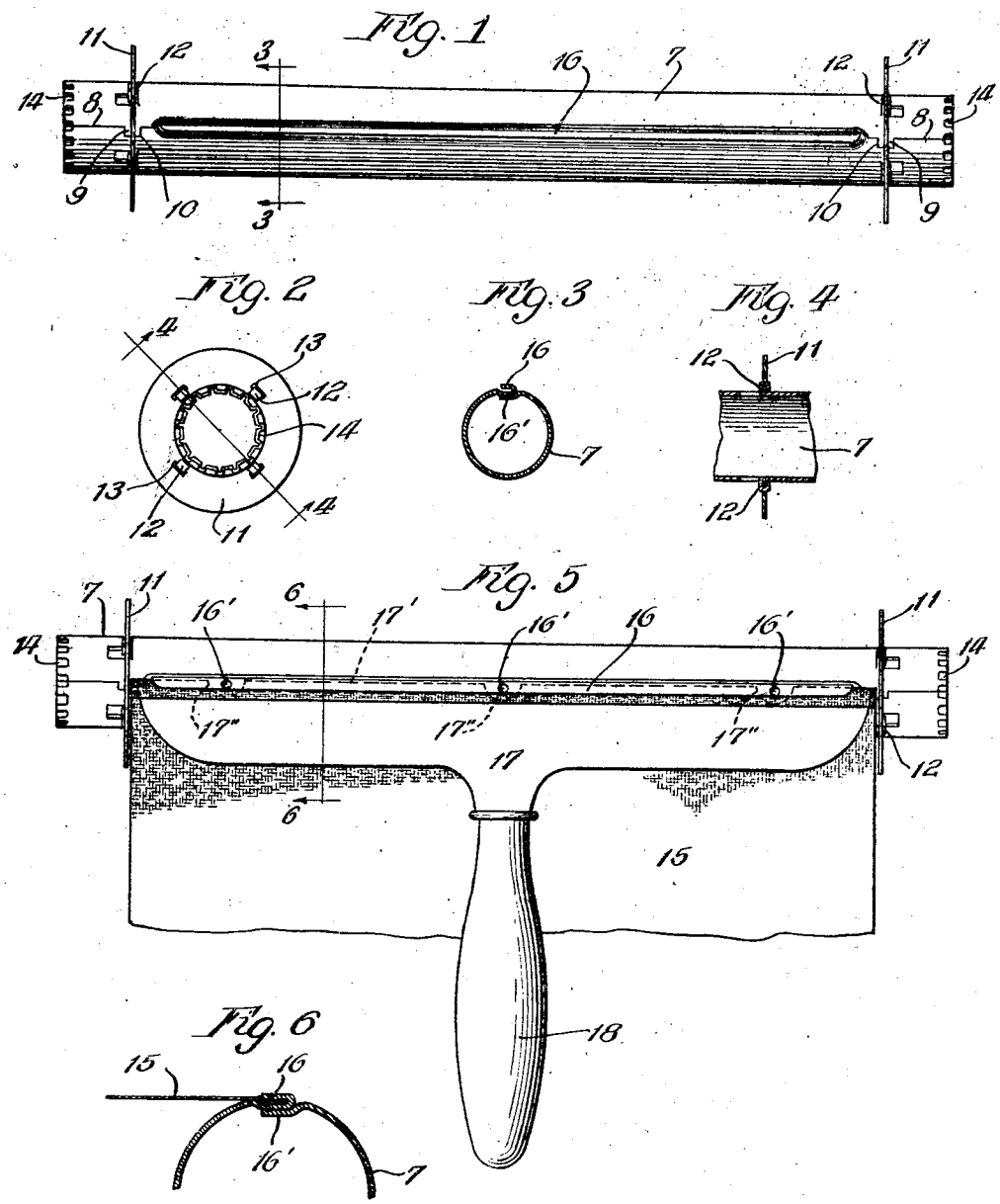

Patented Sept. 2, 1924.

1,506,889

UNITED STATES PATENT OFFICE.

JOSEPH S. DUNCAN, OF CHICAGO, ILLINOIS, ASSIGNOR TO ADDRESSOGRAPH COMPANY, OF CHICAGO, ILLINOIS, A CORPORATION OF ILLINOIS.

RIBBON SPOOL.

Application filed March 9, 1922. Serial No. 542,256.

*To all whom it may concern:*

Be it known that I, JOSEPH S. DUNCAN, a citizen of the United States, residing at Chicago, in the county of Cook and State of Illinois, have invented certain new and useful Improvements in Ribbon Spools, of which the following is a specification.

This invention relates to ribbon spools for printing machines and also to the method of and means for securing the end of an inked ribbon thereto.

The object of the invention is to provide a ribbon spool of simple and comparatively inexpensive construction which is adapted to hold a ribbon securely and so that it will wind and unwind evenly; which is constructed to enable the ribbon to be easily and securely fastened thereto and which is adapted to rigidly engage a driving connection to revolve the spool.

In the accompanying drawings illustrating a selected embodiment of the invention—

Fig. 1 is a plan view of a spool before the ribbon is attached thereto;

Fig. 2 is an end view of the spool;

Fig. 3 is a sectional view on the line 3—3 of Fig. 1;

Fig. 4 is a detail sectional view on the line 4—4 of Fig. 2;

Fig. 5 illustrates the tool and the method of using the same for securing the ribbon to the spool;

Fig. 6 is a sectional view on the line 6—6 of Fig. 5.

Referring to the drawings the spool 7 is preferably formed of a single sheet of thin metal bent to cylindrical shape with its edges abutting at 8, and with one edge provided with projections 9 which engage recesses 10 in the other edge. Circular disk flanges 11—11 are mounted on the cylindrical body of the spool adjacent the ends thereof and these flanges are held in place by lips 12 struck up from the body and engaged with openings 13 in the flanges. The lips are bent outwardly from the spool body, then bent to pass through the openings 13 in the flanges, and then bent inwardly towards the spool body so that the bent lips engage the flanges on opposite sides thereof and, being disposed at intervals around the spools, they secure the flanges to the body of the spool in rigid position.

In the embodiment of the invention illustrated the ends of the spool are open and the edges of the body at the ends of the spool are serrated at 14 for interlocking engagement with means whereby the spool is revolved. I use the word "serrated" herein to indicate generically any formation or deformation of the edges at the ends of the body which will make interlocking engagement with driving means and for this purpose the edges may be corrugated or indented in a variety of ways or they may be polygonally or otherwise shaped to make operative engagement with driving means; and I prefer to make both ends of the spool alike so that the spool may be driven at both ends or at either end, and so that the spool may be reversed end for end as desired.

The ribbon 15 is preferably engaged substantially throughout its width to the spool and for this purpose I provide a flange 16 on the body of the spool approximately extending from one end flange 11 to the other end flange 11, this flange being formed by bending over one edge of the body upon itself between the projections 9, the other edge 16' of the body being lapped under the flanged edge 16, to reinforce and strengthen the flanged edge, as clearly shown in Figs. 3 and 6. The method of securing the ribbon to the spool is as follows:—

The ribbon is folded upon itself at one end and a tool having a blade 17 forming a straight edge, and a handle 18, is engaged with the folded end of the ribbon and is employed to push the folded end of the ribbon under the flange 16. The edge 17' of the tool may be formed on a blade, substantially as shown, or otherwise provided and it is cut away at 17" at intervals so that the flange 16 may be securely and rigidly engaged with the ribbon at said cut away portions of the blade and while the tool is still holding the ribbon in engagement with the flange 16. A center punch may be employed for indenting the flange 16 at 16' to secure the ribbon in place between the flange and that portion of the body of the spool under the flange. The tool is then withdrawn, leaving the folded end of the ribbon engaged under and securely held by the flange 16, but to insure against an uneven tension on the ribbon and to more securely fasten it to the spool I prefer that after the tool has been removed the flange be pressed down to clamp the ribbon throughout its length. In fact it is my present desire that the ribbon should be so securely fastened to the spool that it cannot readily be removed therefrom without cutting or tearing and while the punched indentations 16′ may be sufficient in many cases to fasten the ribbon to the spool, I now consider it advisable to supplement these fastening indentations by pressing down the flange throughout its length to clamp and hold the ribbon. The folded end of the ribbon provides for a substantial engagement of the ribbon with the spool and guards against an insecure connection and against a raveling end.

My invention provides a spool which can be easily made at comparatively low cost, which is strong and substantial in construction and which is adapted to be readily fastened to a ribbon. The invention is especially important when it is employed with a ribbon of considerable width, but it may be used with a narrow ribbon. The end flanges 11 reinforce and strengthen the body of the spool and form edge guides for the ribbon. The serrated edges at the ends of the spool constitute a simple and efficient means for making connection with the driving means for revolving the spool and the serrations may be made to form projections interiorly or exteriorly, as may be desired to cooperate with the particular driving means. The straight edge blade provides a simple and convenient means for engaging the folded end of the ribbon with the spool and by recessing or notching the edge, in or about the manner shown and described, the flange can be readily indented to secure the folded end of the ribbon while the tool is withdrawn but as before stated I prefer to clamp the flange 16 throughout its length upon the folded end of the ribbon after the tool has been withdrawn to make a permanent, secure and rigid connection between the ribbon and the spool.

I am aware that it is possible to change the form and proportion and the detailed construction of the parts of my invention in many respects without departing from the spirit or sacrificing the advantages thereof and I therefore desire to have it understood that I reserve the right to make all such changes, modifications and adaptations as fairly fall within the scope of the following claims.

I claim:

1. A ribbon spool comprising a body made of sheet metal bent to cylindrical form and having an open end, the edge of said open end being indented to provide projections at said open end for making interlocking engagement with driving means for revolving the spool, a disk flange mounted on the body and spaced from the ends thereof, and lips struck up from the body for securing the flange in fixed position on the body.

2. A ribbon spool comprising a body formed of sheet metal bent to cylindrical form and having projections on one edge and recesses on the other edge to receive said projections, disk flanges mounted on the body and spaced from the ends thereof, lips struck up from the body and engaging said flanges to hold them in fixed position on the body, and serrated ends on the body to make engagement with driving means for revolving the spool.

3. A ribbon spool having a body made of sheet metal bent to cylindrical form, disk flanges mounted on said body and spaced from the ends thereof, and means for securing the flanges in fixed position on the body.

4. A ribbon spool comprising a body made of sheet metal bent to cylindrical form, disk flanges mounted on the body and spaced from the ends thereof, and lips struck up from the body and engaging said flanges to hold them in fixed position on the body.

5. A ribbon spool comprising a body made of sheet metal bent to cylindrical form, disk flanges mounted on the body and having openings therein, said flanges being spaced from the ends of the body and lips struck up from the body and engaged with said openings to secure the flanges in fixed position on the body.

6. A ribbon spool comprising a body made of sheet metal bent to cylindrical form, a disk flange mounted on the body and having openings therein, said flanges being spaced from the ends of the body and lips struck up from the body on one side of the flange and projecting outwardly from the body and extended through the openings in the flange and then bent inwardly against the body to hold the flange in rigid position.

7. A ribbon spool having a body made of sheet metal bent to cylindrical form with one edge of the body bent upon itself to form an integral flange for securing a ribbon.

8. A ribbon spool having a body made of sheet metal bent to cylindrical form, one edge thereof overlapping the other edge and being bent upon itself to form an integral flange for holding the ribbon.

9. A ribbon spool having a body made of sheet metal bent to cylindrical form with one edge thereof bent upon itself to form an integral flange for holding the ribbon, disk flanges mounted on the body to hold it in its cylindrical form, and means for holding said disk flanges in rigid position on the body.

10. The combination of a ribbon spool having a body made of sheet metal bent to cylindrical form and having an integral longitudinally extending flange, said flange being indented at intervals and clamped between said indentations upon a ribbon to securely fasten the ribbon to the spool.

11. A tool for securing a ribbon to a spool having an edge to engage the ribbon, said edge being recessed at intervals.

12. A tool for securing a ribbon to a spool having a blade provided with a straight edge to engage a folded end of the ribbon, said edge being recessed at intervals.

13. The combination with a ribbon spool having a flange to receive a ribbon, and a tool adapted to be engaged with a folded end of the ribbon to insert said end beneath the flange and having recesses in its edge to permit the flange to be indented upon the ribbon while still engaged with the tool.

14. The herein described method of securing a ribbon to a spool which consists in providing a tool for inserting an end of a ribbon beneath a flange on the spool, the edge of said tool being recessed at intervals, and then indenting the flange upon the ribbon at said recesses while it is held in place beneath the flange by the tool.

15. The herein described method of securing a ribbon to a spool which consists in providing a tool for inserting an end of a ribbon beneath a flange on the spool, the edge of said tool being recessed at intervals, indenting the flange at said recesses while the ribbon is held beneath the flange by the tool, then removing the tool and pressing the flange down upon the ribbon between the indentations to securely clamp the ribbon to the spool.

JOSEPH S. DUNCAN.